United States Patent [19]

Skrypek et al.

[11] 4,343,391

[45] Aug. 10, 1982

[54] TAKEOFF AND RESTACKING DEVICE FOR CUP-LIKE CONTAINERS

[75] Inventors: John P. Skrypek, Mahwah; Robert Williams, Randolph; James W. Dominico, West Paterson, all of N.J.

[73] Assignee: Sun Chemical Corporation, New York, N.Y.

[21] Appl. No.: 132,513

[22] Filed: Mar. 21, 1980

[51] Int. Cl.³ .............................................. B65G 47/26
[52] U.S. Cl. ..................................... 198/438; 198/486; 101/40; 414/105; 414/737; 414/738; 414/744 B
[58] Field of Search ............... 198/409, 412, 436, 438, 198/486, 689, 480, 484, 489; 101/38 R–40; 414/732, 737, 738, 744 B, 105, 107, 119, 121; 271/9

[56] References Cited

U.S. PATENT DOCUMENTS

| | | | |
|---|---|---|---|
| 1,947,609 | 2/1934 | McNamara | 198/484 |
| 2,590,222 | 3/1952 | Van Veen | 271/9 |
| 2,704,041 | 3/1955 | Christman | 198/486 |
| 3,013,796 | 12/1961 | Currie et al. | 271/9 |
| 3,225,891 | 12/1965 | Hickin et al. | 198/438 |
| 3,587,888 | 6/1971 | Warren | 198/486 |
| 3,616,948 | 11/1971 | Imhof et al. | 198/436 |
| 3,773,457 | 11/1973 | Badoux et al. | 414/105 |
| 3,834,522 | 9/1974 | Jackson | 198/689 |
| 3,860,125 | 1/1975 | Johnson et al. | 198/486 |
| 3,920,128 | 11/1975 | Baker | 414/737 |
| 4,293,272 | 10/1981 | Jellema | 414/121 |

FOREIGN PATENT DOCUMENTS 1088184 10/1967 United Kingdom ................ 198/409

*Primary Examiner*—Joseph E. Valenza
*Attorney, Agent, or Firm*—Cynthia Berlow

[57] ABSTRACT

A takeoff and restacking device is operated in coordination with printing apparatus that applies decorations to the outside of cup-like containers. The apparatus includes a plurality of container holding mandrels extending radially from a turret which moves in angular steps between stations spaced by a distance equal to the space between adjacent mandrels. At one of these stations (takeoff station) a bellows-type suction head mounted on a support arm of the device engages a decorated container and carries it to a stacking region where the container is added to a stack at the rear thereof. The support arm is pivotally mounted to a drive arm on a movable pivot located at one end of the drive arm and intermediate the ends of the support arm. The end of the drive arm remote from the movable pivot is mounted to a fixed pivot about which the drive arm oscillates. The end of the support arm remote from the suction head mounts a cam follower engaged with a stationary cam slot which controls the angular relationship between the support and drive arms as the latter oscillates about the fixed pivot.

15 Claims, 6 Drawing Figures

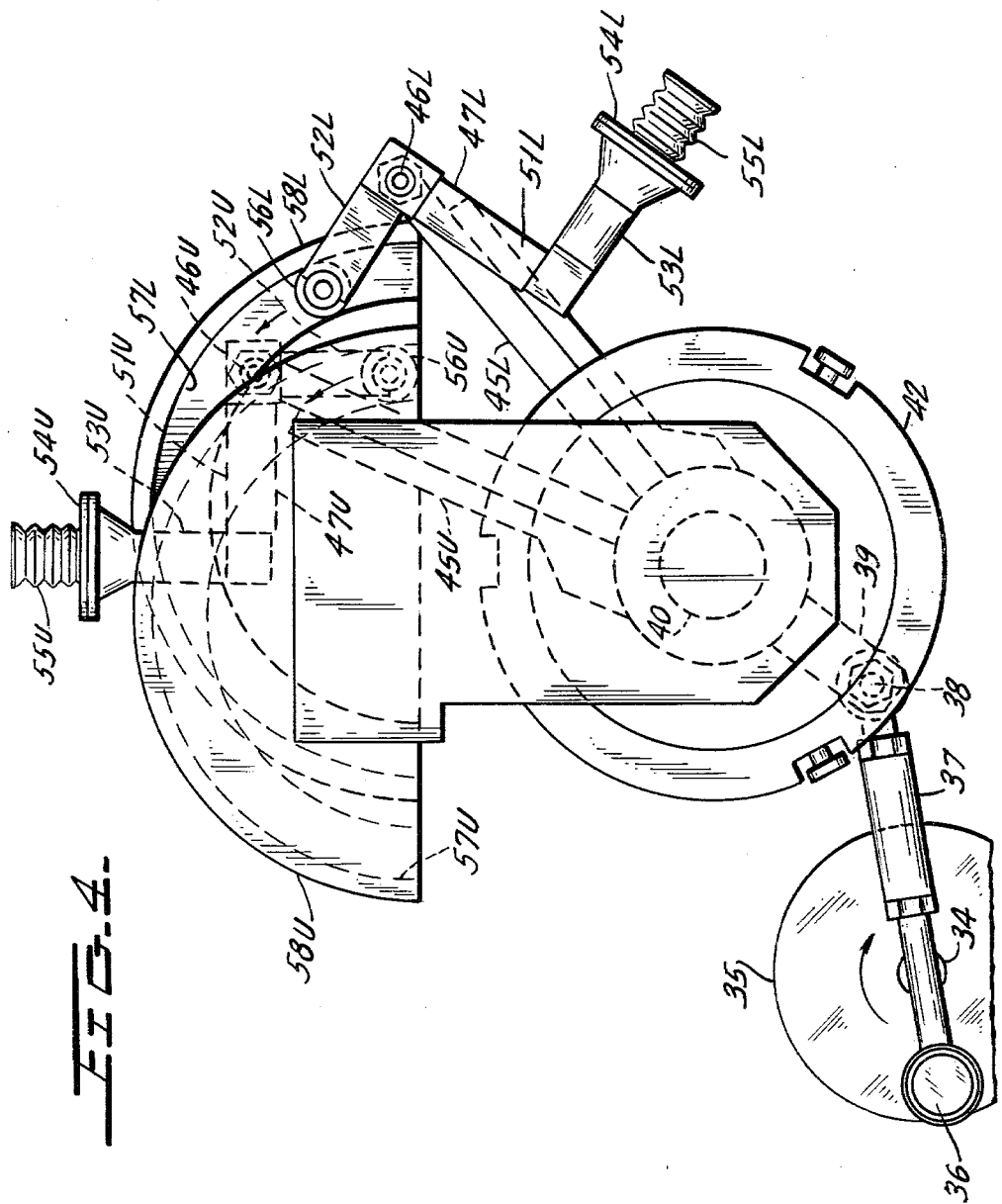

TAKEOFF AND RESTACKING DEVICE FOR CUP-LIKE CONTAINERS

This invention relates to container decorating apparatus in general and more particularly relates to a device for removing and stacking containers decorated by the printing section of the decorating apparatus.

U.S. Pat. No. 3,645,201 issued Feb. 29, 1972 to J. M. Jackson for A Multicolor Printing Machine for Cylindrical and Frustoconical Objects discloses apparatus which includes a turret that is stepped angularly so that mandrels which extend radially from the turret are moved between alternate printing and drying stations, and remain at each of these stations for a predetermined interval of time. An operating cycle for each mandrel commences when the mandrel is stopped at a loading station where a cup-like container is placed on the mandrel. Thereafter, the container carrying mandrel steps between decorating and drying stations so that a cohesive pattern is applied to the outside of the container and is dried thereon. After the decorating operation is completed the container bearing mandrel stops at an unloading station where the container is removed from the mandrel.

The instant invention is concerned with unloading containers from turret mounted mandrels and forming such containers into a stack which is fed from the rear. U.S. Pat. No. 3,834,522 issued Sept. 10, 1974 to J. M. Jackson for a Takeoff and Stacker for Container Printing Machine discloses a device for unloading decorated containers, from a printing machine of the type disclosed in the aforesaid U.S. Pat. No. 3,645,201, and delivering the decorated containers to the rear of a stack.

The takeoff and stacker apparatus of the aforesaid U.S. Pat. No. 3,834,522 is a relatively bulky device, requiring essentially the same amount of floor space as does the printing apparatus. Further, this prior art takeoff device utilizes a large relatively heavy turret which must be angularly stepped in coordination with the turret of the decorating apparatus. The amount of motion required for restacking in the prior art takeoff device necessarily limits operational speed and the turret construction requires an excessive number of moving parts.

The instant invention provides a takeoff and restacker which overcomes the foregoing disadvantages of the prior art. In particular, the device of the instant invention utilizes a support arm which is pivotally mounted intermediate its ends to the end of a drive arm which is oscillated about a fixed pivot located at the end of the drive arm remote from the support arm. A bellows-type suction head secured to one end of the support arm is used to remove decorated containers from the printing machine and carry these containers to a stacking region. The other end of the support arm is provided with a follower in engagement with a stationary cam which is so shaped that at the extremities of each stroke the suction head moves extremely rapidly in the proper direction for loading and unloading, as the case may be, even though the drive arm is decelerating.

Accordingly, a primary object of the instant invention is to provide a novel improved high speed device for removing cup-like containers from printing apparatus having a large turret which is angularly stepped so that containers are moved into a plurality of stations where the containers are alternately decorated and then cured.

Another object is to provide a takeoff and stacker device of this type which is relatively compact.

Still another object is to provide a takeoff and stacker device of this type which is of simplified construction.

These objects as well as other objects of this invention shall become readily apparent after reading the following description of the accompanying drawings in which:

FIG. 4 is an enlarged fragmentary plan view of the device of FIG. 1.

FIG. 5 is an enlarged elevation showing the suction holding device at the takeoff station prior to engagement between the suction cup and decorated container.

FIG. 5a shows the elements of FIG. 5 when the suction cup is fully collapsed and holding a decorated container.

Figure 1:
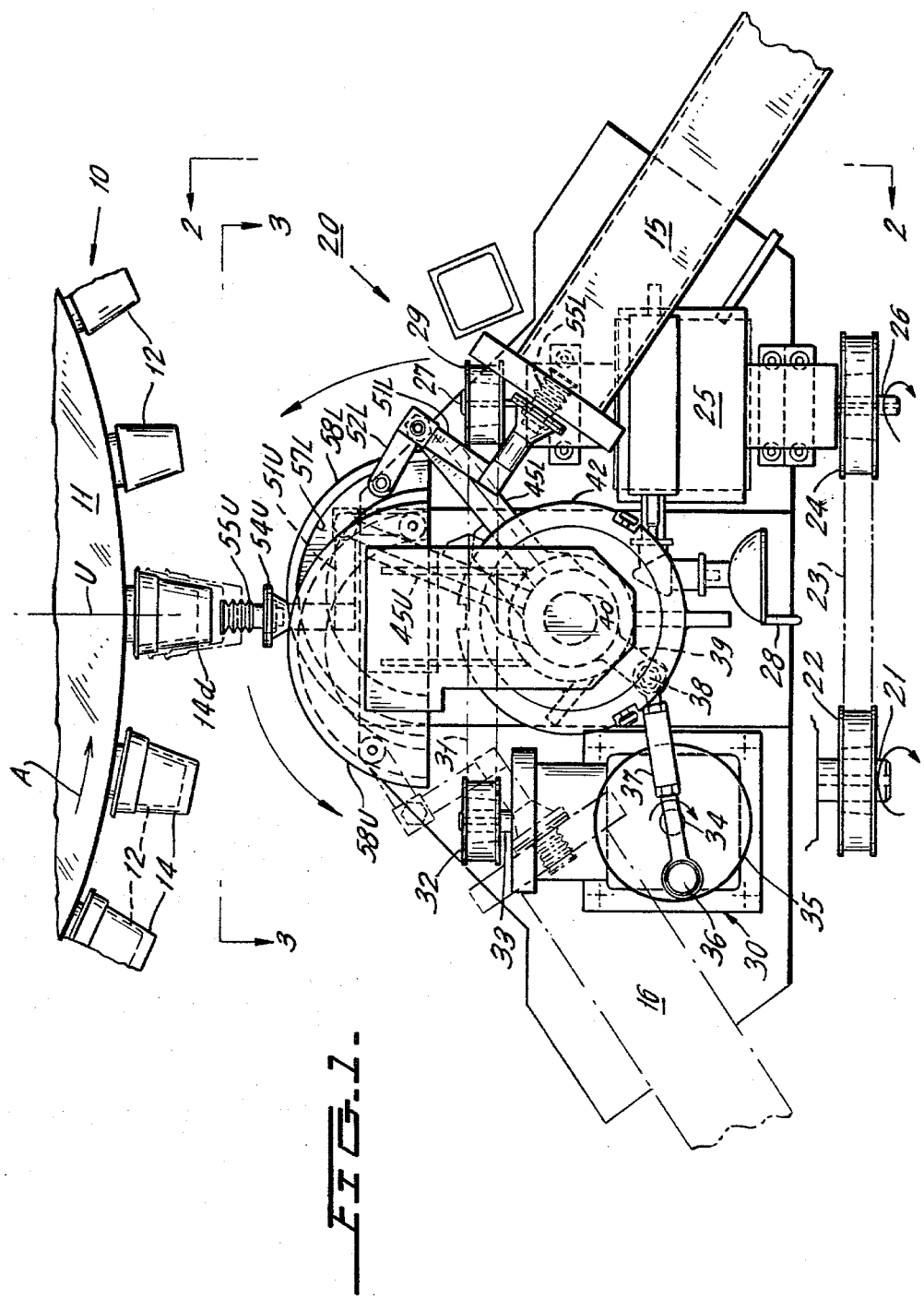
FIG. 1 is a plan view of a takeoff and stacker device constructed in accordance with teachings of the instant invention.
Figure 2:
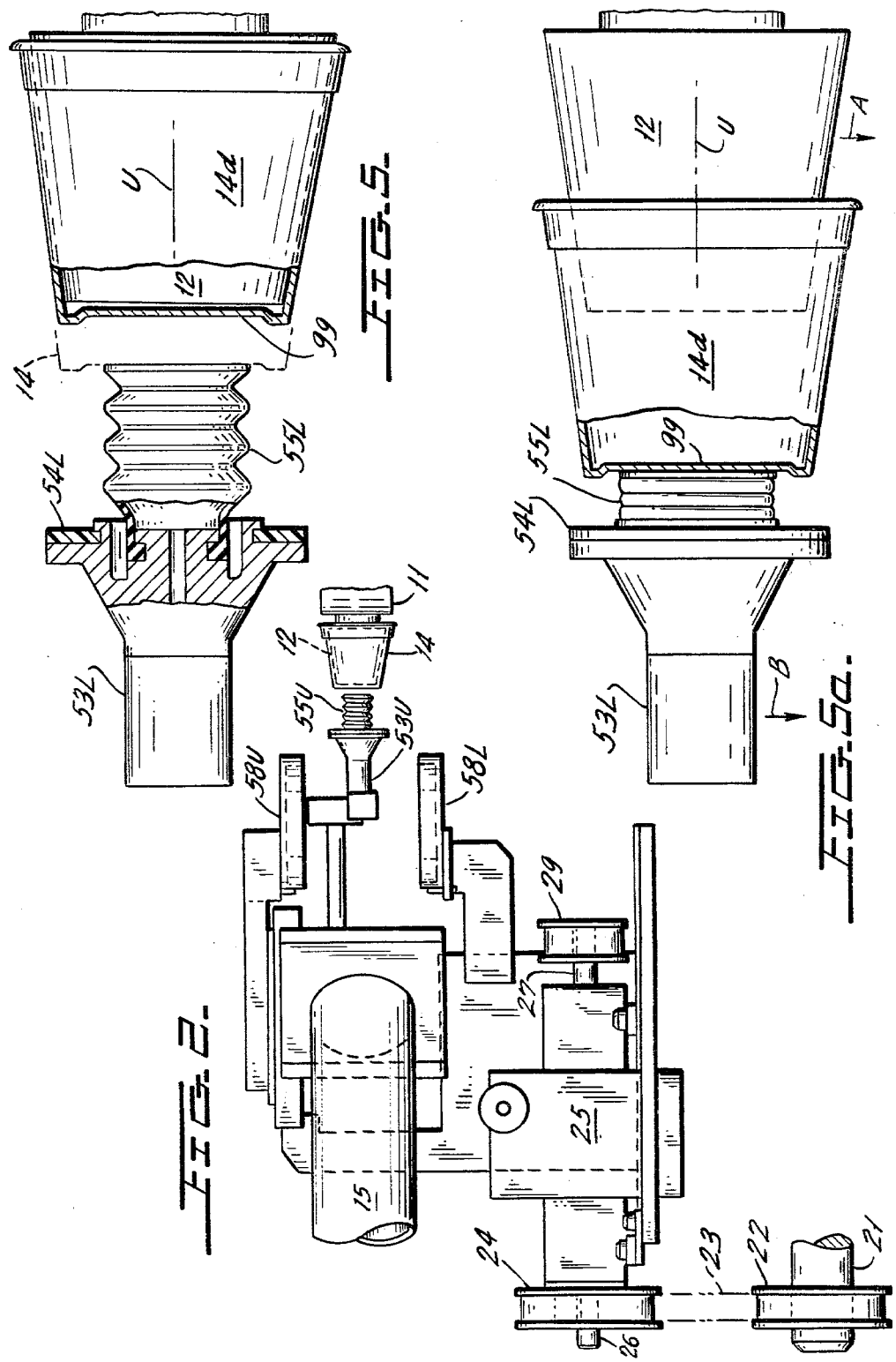
FIG. 2 is a partial side elevation of the device of FIG. 1 looking in the direction of arrows 2—2.

Now referring to the Figures and more particularly to FIG. 1 which shows the operative relationship between container decorator 10 of the type illustrated in the aforesaid U.S. Pat. No. 3,645,201, and takeoff-restacker device 20 constructed in accordance with teachings of the instant invention. Decorator 10 includes turret 11 having a plurality of mandrels 12 equally spaced along the periphery thereof and extending radially outward. Turret 11 is operated intermittently by being angularly stepped in the direction indicated by arrow A, with each step being equal to the angular separation between adjacent mandrels 12. After cup-like containers 14 on mandrels 12 are decorated and the decorations are dried or cured, the mandrel 12 carrying the decorated container 14d is stopped at an unloading station U where decorated container 14d is removed by device 20 and is carried to either stacking region 15 or 16 depending upon which section of device 20 engages the particular decorated container 14d, as will be hereinafter seen.

Turret 11 is driven by an intermittent motion mechanism (not shown) having an input which is driven continuously. This input is coupled to shaft 21 having sprocket 22 keyed thereto. Timing belt 23 provides a driving connection between sprockets 22 and 24 with the latter being keyed to input shaft 26 of phase adjuster 25 having output shaft 27 and hand operated adjusting crank 28.

Sprocket 29 keyed to shaft 27 drives timing belt 31 which is engaged with sprocket 32 keyed to input shaft 33 of right angle gear box 30 whose output shaft 34 is at right angles to input shaft 33. Horizontally disposed disc 35 is centered with respect to output shaft 34 and is continuously driven by the latter.

Figure 3:
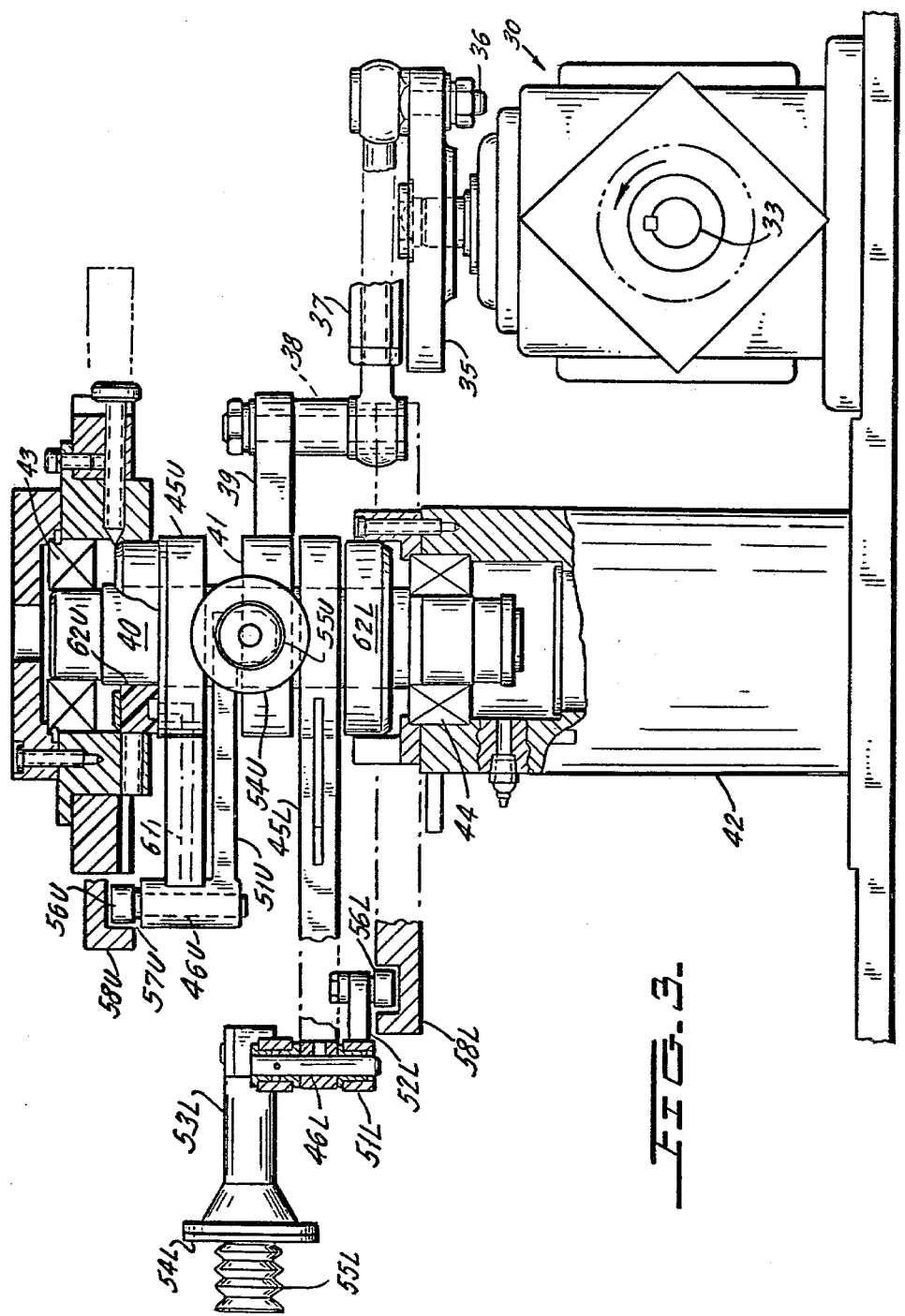
FIG. 3 is an enlarged side elevation of the device of FIG. 1 looking in direction of arrows 3—3.

One end of adjustable crank arm 37 is connected to disc 35 at pivot 36 which is laterally offset from output shaft 34. The other end of arm 37 is connected at pivot 38 to the free end of arm 39 which extends radially from clamp 41 secured to hollow shaft 40 (FIG. 3). The latter is pivotally supported by bearings 43, 44 at opposite ends thereof, is axially aligned with vertical post 42, extending upwardly therefrom. Also clamped to shaft 40 are respective upper and lower drive arms 45U and 45L which are of identical construction. The end of arm 45U remote from shaft 40 is connected at pivot 46U to Z-shaped support arm 47U. The latter includes end sections 52U and 53U which extend in opposite directions from opposite ends of joining section 51U. The free end of section 53U mounts bellows type suction cup 55U and bumper ring 54U positioned at the inboard end of suction cup 55U, as shown in FIG. 4. Pivotally mounted at the free end of section 52U is follower roller 56U which is disposed within cam groove 57U of stationary cam plate 58U. Groove 57U is an arc of uniform radius.

Connecting air passages extend lengthwise through sections 51U and 53U as well as through arm 45U and portions of pivotal connection 46U. Air passage 61 through drive arm 45U extends to the upper surface of the enlarged hub at the end of arm 45U remote from pivot 46U. This upper surface is in sliding engagement with stationary valve element 62U so that for preselected angular positions of drive arm 45U, passage 61 is connected to a low pressure source, a high pressure source or to atmosphere as required to achieve a desired condition inside of suction cup 55U. Lower drive arm 45L is inverted with respect to upper drive arm 45U and the lower surface of the enlarged hub of the latter is in sliding engagement with the upper surface of stationary valve member 62L having valve depressions in the upper surface thereof.

While Z-shaped support arms 51U and 51L are of identical construction, the latter is inverted with respect to the former so that suction cups 55U and 55L will be able to engage decorated containers at the same unloading station U. This is made possible by having end section 53U offset upwardly from the common plane wherein joining and end sections 51U, 52U are disposed. Similarly, end section 53L is offset downwardly from the common plane wherein end section 52L and joining section 51L are disposed. Cam follower 56L rides in arcuate cam slot 57L in the upper surface of stationary cam plate 58L.

As seen in FIG. 1, when upper suction cup 55U arrives at unloading station U lower suction cup 55L is delivering a decorated container at stacking region 15. Drive arms 45U and 45L then pivot counterclockwise with respect to FIG. 1 until suction cup 55L is at unloading station U and suction cup 55U is at stacking region 16. Valve members 62U and 62L are so constructed that suction cups 55U and 55L have suction or low pressure applied thereto when they stop at unloading station U. This suction is maintained as the respective suction cups 55U and 55L travel from unloading station U to the respective stacking regions 15, 16. When suction cups 55L and 55U are at the respective stacking regions 15, 16 pressurized air is applied to the suction cups to positively release the decorated containers being carried thereby.

Now referring more particularly to FIGS. 5 and 5a, it is seen that as suction cup 55L arrives at unloading station U the former is extended, but even in this position the free end of suction cup 55L is spaced from closed end 99 of decorated container 14d. Pressurized air applied through one or more conduits in mandrel 12 and extending to the free end thereof drive container 14d towards suction cup 55L. The low pressure within suction cup 55L generates a suction force which holds container 14d firmly seated on the free end of suction cup 55L while the latter collapses to the position shown in FIG 5a.

With suction cup 55L fully collapsed there is a substantial space between bottom 99 of container 14d and bumper 54L. This space provides clearance which enables container 14d to tilt with respect to end section 53L. That is, for certain size containers, there is interference between the latter and mandrels 12 during initial movement of the container in the direction of arrow B toward the stack at region 15. More particularly, as seen in FIG. 5a, when bellows-type suction cup 55L is fully collapsed mandrel 12 extends substantially into container 14d. As mandrel 12 moves in the direction of arrow A and suction cup 55L moves in the direction of arrow B these elements diverge and mandrel 12 withdraws from container 14d. However, during this withdrawal there is slight interference between these elements, but this does not present any problems since the resilient suction cup 55L permits container 14d to tilt as required in order to achieve complete separation of container 14d from mandrel 12.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. Apparatus for removing cup-like containers one at a time from mandrels, extending radially from the turret of a container decorator, when each of these mandrels stops at a takeoff station, and delivering such containers to the rear of a stack located at a stacking region remote from the takeoff station; said apparatus including a drive arm, a support arm, a laterally movable first pivot operatively connecting said support and drive arms, first means connected to said support arm for holding each of the containers as they move between said takeoff station and said stacking region, cam means connected to said support arm at a location displaced from this first pivot the control the angular relationship between said drive and support arms as a function of the angular position of said drive arm about a second pivot laterally displaced from said first pivot, and drive means operatively connected to said drive arm for moving the latter about said second pivot as a center, said first means comprising a suction head which includes a bellows for engaging containers at said takeoff station, said bellows being substantially collapsed while carrying containers from said takeoff station to said stacking region, said bellows when substantially collapsed being sufficiently resilient to permit tilting of a container carried by said suction head in the event there is interference between said container and the mandrel from which the container is being removed.

2. Apparatus as set forth in claim 1 in which the cam means includes a follower mounted on said support arm and a stationary cam operatively engaged by said follower.

3. Apparatus as set forth in claim 2 in which the first pivot is connected to said support arm at a point intermediate said follower and said first means, said second pivot being stationary.

4. Apparatus as set forth in claim 2 in which the cam is an arcuate track of uniform radius.

5. Apparatus as set forth in claim 3 in which the drive means imparts oscillating motion to said drive arm about said second pivot as a center.

6. Apparatus as set forth in claim 5 in which oscillation of said drive arm causes said follower to oscillate with respect to said cam which in turn causes said support arm to oscillate about said first pivot as a center.

7. Apparatus as set forth in claim 5 in which the first means is laterally displaced from a line perpendicular to said first pivot and extending through said follower.

8. Apparatus as set forth in claim 1 in which the support arm includes a first end section, a second end section and a joining section; said first and second end sections extending in opposite directions from said joining section and being at opposite ends thereof; said first pivot being at the junction between said first and joining sections; said cam means being at the end of said first section remote from said joining section and said first means being at the end of said second section remote from said joining section.

9. Apparatus for removing cup-like containers one at a time from mandrels, extending radially from the turret of a container decorator, when each of these mandrels stops at a takeoff station, and delivering such containers to the rear of a stack located at a stacking region remote from the takeoff station; said apparatus including a drive arm, a support arm, a laterally movable first pivot operatively connecting said support and drive arms, first means connected to said support arm for holding each of the containers as they move between said takeoff station and said stacking region, cam means connected to said support arm at a location displaced from said first pivot to control the angular relationship between said drive and support arms as a function of the angular position of said drive arm about a second pivot laterally displaced from said first pivot, and drive means operatively connected to said drive arm for moving the latter about said second pivot as a center, said apparatus also delivering containers from said takeoff station to the rear of another stack located at another stacking region located remote from the takeoff station and the stacking region; said apparatus also including another drive arm mounted for pivotal movement about said second pivot as a center, another support arm, a laterally movable third pivot operatively connecting said another support and drive arms, second means connected to said another support arm for holding each of those containers moving from said takeoff station to said another stacking region, another cam means connected to said another support arm at a location displaced from said third pivot to control the angular relationship between said another drive and support arms as a function of the angular position of said another drive arm which is laterally displaced from said third pivot, said drive means also operatively connected to said another drive arm for moving the latter about said second pivot as a center; said drive arm and said another drive arm being angularly displaced from each other and oscillating in unison.

10. Apparatus as set forth in claim 9 in which the first and second means engage alternate containers appearing at said takeoff station; said first pivot moving in a first direction as a container is being delivered to said stacking region; said third pivot moving in a second direction, opposite said first direction as a container is being delivered to said another stacking region.

11. Apparatus as set forth in claim 10 in which the support arm includes a first end section, a second end section and a joining section; said first and second end sections extending in opposite directions from said joining section and being at opposite ends thereof; said first pivot being at the junction between said first and joining sections; said cam means being at the end of said first section remote from said joining section and said first means being at the end of said second section remote from said joining section; said another support arm includes a third end section, a fourth end section and another joining section; said third and fourth end sections extending in opposite directions from said another joining section and being at opposite ends thereof; said third pivot being at the junction between said third and joining sections; said another cam means being at the end of said third section remote from said another joining section and said second means being at the end of said fourth section remote from said joining section.

12. Apparatus as set forth in claim 11 in which the first and second means move in a common plane perpendicular to said second pivot; said cam means moving in a second plane and said another cam means moving in a third plane; said first plane being disposed between said second and third planes and being parallel thereto.

13. Apparatus as set forth in claim 8 in which said first and second sections are disposed to move in generally parallel laterally offset planes positioned perpendicular to said first pivot.

14. Apparatus as set forth in claim 9 in which said cam means and said another cam means each includes a stationary arcuate track of uniform radius.

15. Apparatus as set forth in claim 9 in which said first means comprises a suction head which includes a bellows for engaging containers at said takeoff station, said bellows being substantially collapsed while carrying containers from said takeoff station to said stacking region, said bellows when substantially collapsed being sufficiently resilient to permit tilting of a container carried by said suction head in the event there is interference between said container and the mandrel from which the container is being removed; said second means comprising another suction head including another bellows for engaging containers at said takeoff station, said another bellows being substantially collapsed when carrying containers from said takeoff station to said another stacking region, said another bellows when substantially collapsed being sufficiently resilient to permit tilting of a container carried by said another suction head in the event there is interference between the last mentioned container and the mandrel from which the last mentioned container is being removed.

* * * * *